US011714644B2

(12) United States Patent
Abhishek Raja

(10) Patent No.: US 11,714,644 B2
(45) Date of Patent: Aug. 1, 2023

(54) PREDICATED VECTOR LOAD MICRO-OPERATION FOR PERFORMING A COMPLETE VECTOR LOAD WHEN ISSUED BEFORE A PREDICATE OPERATION IS AVAILABLE AND A PREDETERMINED CONDITION IS UNSATISFIED

(71) Applicant: Arm Limited, Cambridge (GB)

(72) Inventor: Abhishek Raja, Austin, TX (US)

(73) Assignee: Arm Limited, Cambridge (GB)

( * ) Notice: Subject to any disclaimer, the term of this patent is extended or adjusted under 35 U.S.C. 154(b) by 124 days.

(21) Appl. No.: 17/459,130

(22) Filed: Aug. 27, 2021

(65) Prior Publication Data

US 2023/0067573 A1    Mar. 2, 2023

(51) Int. Cl.
*G06F 9/30* (2018.01)
*G06F 9/38* (2018.01)

(52) U.S. Cl.
CPC ...... *G06F 9/30043* (2013.01); *G06F 9/30036* (2013.01); *G06F 9/30145* (2013.01); *G06F 9/3836* (2013.01)

(58) Field of Classification Search
CPC ............. G06F 9/30018; G06F 9/30036; G06F 9/30043; G06F 9/30145; G06F 9/3836
See application file for complete search history.

(56) References Cited

U.S. PATENT DOCUMENTS

| | | | |
|---|---|---|---|
| 2003/0126414 A1* | 7/2003 | Grochowski | G06F 9/3861 712/225 |
| 2010/0325483 A1* | 12/2010 | Gonion | G06F 9/3838 714/10 |
| 2014/0181580 A1* | 6/2014 | Bharadwaj | G06F 9/30043 714/15 |
| 2018/0203756 A1* | 7/2018 | Stephens | G06F 11/0793 |
| 2018/0253310 A1* | 9/2018 | Stephens | G06F 9/3013 |
| 2018/0307491 A1* | 10/2018 | Carro | G06F 9/30072 |

* cited by examiner

*Primary Examiner* — David J. Huisman
*Assistant Examiner* — Kasim Alli
(74) *Attorney, Agent, or Firm* — Nixon & Vanderhye P.C.

(57) ABSTRACT

A predicated vector load micro-operation specifies a load target address, a destination vector register for which active vector elements of the destination vector register are to be loaded with data associated with addresses identified based on the load target address, and a predicate operand indicative of whether each vector element of the destination vector register is active or inactive. A predetermined type of predicated vector load micro-operation can be issued to the processing circuitry before the predicate operand is determined to meet an availability condition, and if issued in this way memory access circuitry can determine, based on the load target address, whether the predetermined type of predicated vector load micro-operation satisfies a predetermined condition, and if the predetermined condition is unsatisfied, perform a complete vector load assuming all vector elements of the destination vector register are active vector elements, independent of whether the predicate operand when available identifies any inactive vector element of the destination vector register.

20 Claims, 4 Drawing Sheets

PREDICATED VECTOR LOAD MICRO-OPERATION FOR PERFORMING A COMPLETE VECTOR LOAD WHEN ISSUED BEFORE A PREDICATE OPERATION IS AVAILABLE AND A PREDETERMINED CONDITION IS UNSATISFIED

BACKGROUND

Technical Field

The present technique relates to the field of data processing.

Technical Background

A vector operation is an operation for which an operand and/or a result of the operation is a vector comprising two or more vector elements representing independent data values. Vector operations can help to improve processing throughput compared to scalar operations. A vector operation can be predicated using a predicate operand, which may indicate whether respective vector elements are active or inactive. Operations associated with inactive elements can be masked based on the predicate operand.

SUMMARY

At least some examples provide an apparatus comprising:
processing circuitry to perform data processing in response to micro-operations decoded from instructions, the processing circuitry comprising memory access circuitry to control issuing of memory access requests; and
issue circuitry to control issuing of the micro-operations to the processing circuitry based on whether operands of the micro-operations meet an availability condition; in which:
in response to a predicated vector load micro-operation specifying a load target address, a destination vector register for which active vector elements of the destination vector register are to be loaded with data associated with addresses identified based on the load target address, and a predicate operand indicative of whether each vector element of the destination vector register is active or inactive:
  when the predicated vector load micro-operation is a predetermined type of predicated vector load micro-operation, the issue circuitry is capable of issuing the predetermined type of predicated vector load micro-operation to the processing circuitry before the predicate operand is determined to meet the availability condition; and
  when the predetermined type of predicated vector load micro-operation is issued to the processing circuitry before the predicate operand meets the availability condition, the memory access circuitry is configured to:
    determine, based on the load target address, whether the predetermined type of predicated vector load micro-operation satisfies a predetermined condition; and
    in response to determining that the predetermined condition is unsatisfied for the predetermined type of predicated vector load micro-operation, perform a complete vector load assuming all vector elements of the destination vector register are active vector elements, independent of whether the predicate operand when available identifies any inactive vector element of the destination vector register.

At least some examples provide a method comprising:
controlling issuing of micro-operations, decoded from instructions, to processing circuitry, where the controlling of issuing is based on whether operands of the micro-operations meet an availability condition, and the processing circuitry comprises memory access circuitry to control issuing of memory access requests; and
in response to a predicated vector load micro-operation specifying a load target address, a destination vector register for which active vector elements of the destination vector register are to be loaded with data associated with addresses derived from the load target address, and a predicate operand indicative of whether each vector element of the destination vector register is active or inactive, when the predicated vector load micro-operation is a predetermined type of predicated vector load micro-operation:
  issuing the predetermined type of predicated vector load micro-operation to the processing circuitry before the predicate operand is determined to meet the availability condition;
  determining, based on the load target address, whether the predetermined type of predicated vector load micro-operation satisfies a predetermined condition; and
  in response to determining that the predetermined condition is unsatisfied for the predetermined type of predicated vector load micro-operation, performing a complete vector load assuming all vector elements of the destination vector register are active vector elements, independent of whether the predicate operand when available identifies any inactive vector element of the destination vector register.

At least some examples provide a non-transitory computer-readable medium to store computer-readable code for fabrication of an apparatus comprising:
processing circuitry to perform data processing in response to micro-operations decoded from instructions, the processing circuitry comprising memory access circuitry to control issuing of memory access requests; and
issue circuitry to control issuing of the micro-operations to the processing circuitry based on whether operands of the micro-operations meet an availability condition; in which:
in response to a predicated vector load micro-operation specifying a load target address, a destination vector register for which active vector elements of the destination vector register are to be loaded with data associated with addresses identified based on the load target address, and a predicate operand indicative of whether each vector element of the destination vector register is active or inactive:
  when the predicated vector load micro-operation is a predetermined type of predicated vector load micro-operation, the issue circuitry is capable of issuing the predetermined type of predicated vector load micro-operation to the processing circuitry before the predicate operand is determined to meet the availability condition; and
  when the predetermined type of predicated vector load micro-operation is issued to the processing circuitry before the predicate operand meets the availability condition, the memory access circuitry is configured to:

determine, based on the load target address, whether the predetermined type of predicated vector load micro-operation satisfies a predetermined condition; and in response to determining that the predetermined condition is unsatisfied for the predetermined type of predicated vector load micro-operation, perform a complete vector load assuming all vector elements of the destination vector register are active vector elements, independent of whether the predicate operand when available identifies any inactive vector element of the destination vector register.

Further aspects, features and advantages of the present technique will be apparent from the following description of examples, which is to be read in conjunction with the accompanying drawings.

DESCRIPTION OF EXAMPLES

Figure 1:
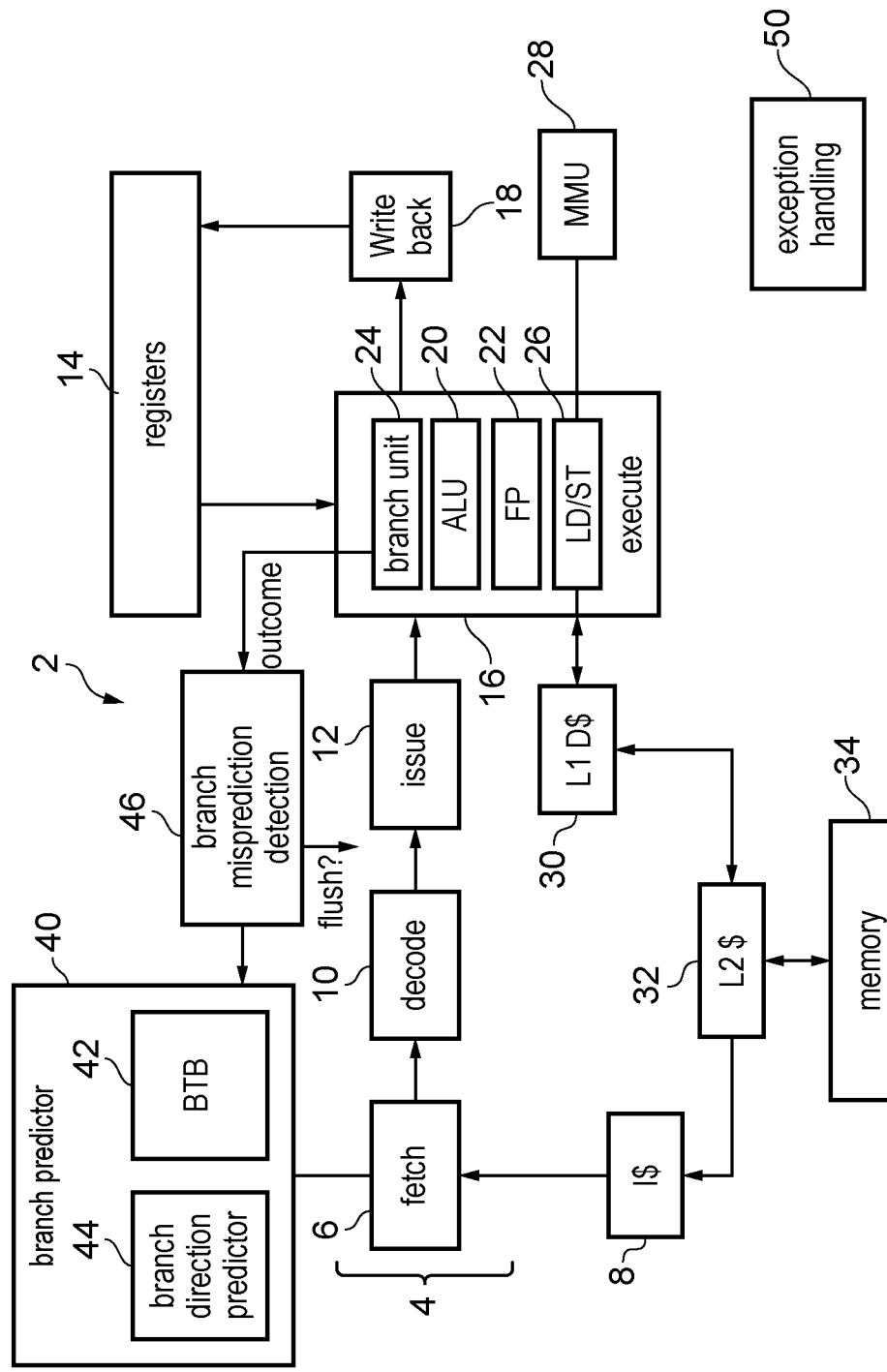
FIG. 1 schematically illustrates an example of a data processing apparatus.

An apparatus has processing circuitry to perform data processing in response to micro-operations decoded from instructions, and issue circuitry to control issuing of the micro-operations to the processing circuitry based on whether operands of the micro-operations meet an availability condition. The processing circuitry comprises memory access circuitry to control issuing of memory access requests. In general the term "micro-operation" may refer to the representation of a processing operation to be performed, as seen by the processing circuitry—in some cases these could simply correspond exactly to the corresponding instructions as defined in an instruction set architecture, but in other cases the micro-operation may be different from the corresponding program instruction from which it is decoded, or could represent only part of the operation of a corresponding program instruction. Hence, when decoding instructions to form micro-operations to be issued to the processing circuitry, the mapping of instructions to micro-operations could be one-to-one, many-to-one, one-to-many or many-to-many. For example, a single instruction could be mapped to a single micro-operation, or to a set of two or more micro-operations which collectively control the processing circuitry to perform the operations represented by the instruction. Also, it is possible to fuse two or more separate instructions into a combined micro-operation.

One type of micro-operation that can be supported by the processing circuitry is a predicated vector load micro-operation which specifies a load target address, a destination vector register, and a predicate operand. The predicate operand indicates whether each vector element of the destination vector register is active or inactive. In response to the predicated vector load micro-operation, the memory access circuitry of the processing circuitry issues memory access requests to load the active vector elements of the destination vector register with data associated with addresses identified based on the load target address. Normally, for a predicated vector load micro-operation, one would expect that inactive vector elements of the destination vector register should not be loaded with data in response to the predicated vector load micro-operation. Typically, this means that the predicated vector load micro-operation cannot be issued for processing until its predicate operand is determined to meet an availability condition.

In the examples discussed below, a predetermined type of predicated vector load micro-operation is supported. When the issue circuitry encounters a predicated vector load micro-operation of the predetermined type, the issue circuitry is capable of issuing the predetermined type of predicated vector load micro-operation to the processing circuitry before the predicate operand is determined to meet the availability condition. When the predetermined type of predicated vector load micro-operation is issued to the processing circuitry before the predicate operand meets the availability condition, the memory access circuitry determines, based on the load target address, whether the predetermined type of predicated vector load micro-operation satisfies a predetermined condition, and in response to determining that the predetermined condition is unsatisfied for the predetermined type of predicated vector load micro-operation, performs a complete vector load assuming all vector elements of the destination vector register are active vector elements, independent of whether the predicate operand when available identifies any inactive vector element of the destination vector register.

This type of predicated vector load micro-operation can be useful in scenarios where the predicate operand is being generated based on an earlier operation, which can be relatively slow. It is recognised that there can be some scenarios in which it is acceptable for the vector load micro-operation to load too many vector elements, despite the predicate operand specifying that some of those vector elements are inactive. For example, there may be a subsequent operation which will use the same predicate to control a vector operation applied to the vector operand loaded to the destination register of the predicated vector load micro-operation, and so a vector element that is incorrectly loaded with data when it should have been inactive may in any case not be processed by that subsequent operation. Therefore, provided that a predetermined condition does not arise, it can be acceptable to allow a complete vector load to be performed in which all vector elements of the destination vector register are treated as active vector elements. This makes it possible to issue the predetermined type of predicated vector load micro-operation early, before its predicate operand is determined to meet the availability condition, improving throughput of instructions and hence improving overall processing performance.

In response to the memory access circuitry determining that the predetermined condition is satisfied when the predetermined type of predicated vector load micro-operation is issued to the processing circuitry before the predicate operand meets the availability condition, the memory access circuitry rejects the predetermined type of predicated vector load micro-operation and the issue circuitry re-issues the predetermined type of predicated vector load micro-operation to the processing circuitry. Hence, if a predetermined condition arises which indicates that performing the complete vector load could be undesirable, the predetermined type of vector load micro-operation can be rejected back to the issue circuitry so that it can be re-issued at a later time by which point the predicate operand may have become available.

In some implementations, the issue circuitry could, after a given instance of the predetermined type of predicated vector load micro-operation has been rejected by the memory access circuitry, simply attempt to reissue the predicated vector load micro-operation without determining whether the predicate operand has yet been determined to meet the availability condition. For example, some relatively simple implementations could blindly re-issue the predicated vector load micro-operation independent of any determination of availability of the predicate operand, if a previous attempt has been rejected by the memory access circuitry. With this approach, even if it takes several attempts to issue the predicated vector load micro-operation before the memory access circuitry determines that the operation can be processed (once the predicate operand is available), overall the occurrence of the predetermined condition may be rare enough that performance as a whole improves because most of the time the early issue of the predetermined type of predicated vector load micro-operation does not result in a rejection by the memory access circuitry, and so occasionally needing to re-issue the same predicated vector load micro-operation a number of times may not significantly harm performance.

Alternatively, after rejection by the memory access circuitry due to the predetermined condition being satisfied, the issue circuitry may determine whether the predicate operand meets the availability condition before deciding whether to re-issue the predetermined type of vector load micro-operation. Hence, the issue circuitry may re-issue the predetermined type of predicated vector load micro-operation to the processing circuitry when the predicate operand is determined to meet the availability condition. This approach can help to avoid wasted slots in the processing pipeline caused by attempts to reissue the predetermined type of predicated vector load micro-operation when it is likely that the micro-operation cannot be processed yet because the predicate operand is not yet meeting the availability condition and it has already been determined that the predetermined condition is satisfied.

The availability condition can be implemented in various ways. In some examples, the predicate operand may be considered to meet the availability condition when the predicate operand is already available at the time when the availability condition is being evaluated by the issue circuitry. For example, the predicate operand may be considered to meet the availability condition once the predicate operand has been written to a register by an earlier instruction. However, it is also possible for the availability condition to be determined to be satisfied before the predicate operand is actually available in a source register, if the predicate operand is determined to become available by the time that the predicated vector load micro-operation reaches the stage of the pipeline at which the predicate operand would be needed. For example, if the issue circuitry determines that an earlier operation is being processed which will generate the predicate operand then the predicate operand may be considered to meet the availability condition once that earlier operation has reached a certain processing stage. Hence, it will be understood that the particular conditions required to be satisfied for the predicate operand to meet the availability condition may vary depending on the particular implementation of a processing pipeline (for example, this may depend on the length of the pipeline and which particular stages of the pipeline generate and consume predicate values), but in general the availability condition may be a condition which, when satisfied, indicates that the predicate operand will at least be ready in time for the predicate operand to be used by the predetermined type of predicated vector load micro-operation.

When the predetermined type of predicated vector load micro-operation is issued early before the predicate operand meets the availability condition, and the memory access circuitry performs the complete vector load assuming that all vector elements of the destination vector register are active vector elements, then subsequently the predicate operand may become available and may indicate that at least one vector element of the destination vector register was inactive. Normally, one would expect that if the processing circuitry has speculated on the predicate operand indicating all elements as active, then if it is subsequently determined that this speculation was incorrect, one should flush the incorrectly speculated operation from the pipeline to prevent the destination vector register taking an incorrect result, and flush subsequent operations which could depend on the incorrectly speculated load micro-operation.

However, for the predetermined type of predicated vector load micro-operation discussed above, in cases when the predetermined condition was determined to be unsatisfied for the predetermined type of predicated vector load micro-operation, counter-intuitively the complete vector load is allowed to proceed without being flushed, even when the predicate operand when available indicates at least one inactive vector element. Hence, the incorrectly loaded data is allowed to remain within the inactive vector elements of the destination vector register. This may seem to be incorrect, but it is recognised that often a subsequent operation following vector load may process the loaded data elements under control of the same predicate operand, so that incorrectly loaded data will not be processed anyway and the end result after that subsequent operation may be the same as if the predicate operand had been available at the time of processing the predicated vector load and the loading of the inactive vector elements had been suppressed. Hence, by providing a type of predicated vector load micro-operation which indicates to the processing circuitry that it is acceptable to issue the micro-operation without waiting for availability of the predicate operand and to allow a complete vector load to persist even if the predicate operand subsequently identifies an inactive vector element, this can help to improve performance.

It is recognised that sometimes it may not be appropriate to perform a complete vector load in cases when the predicate operand once available indicates at least one inactive vector element. For example, sometimes accessing memory for a particular address may cause at least one address-dependent memory-access-related side-effect. The side-effect may be an additional effect of the memory access, other than the normal effect one would expect to arise for any load request to access memory (e.g. the normal effects may include updates of destination register with the loaded data, update of tracking data associated with the pending load request, updating of cache tags and other related metadata to account for the load, and update of coherency state information associated with a coherency scheme). Such side-effects may be rarely occurring events which do not occur for the majority of conventional memory accesses to memory storage. If a memory access associated with an inactive vector element of the destination vector register causes such a side-effect, then even if that inactive vector element is not processed by a subsequent predicated operation, the fact that the inactive vector element was incorrectly loaded may cause an undesired effect which may be visible to the software being executed or to the user of the apparatus, which may be undesirable. Therefore, to prevent such undesired side-effects being caused by the early issuing of the predetermined type of predicated vector load micro-operation, the memory access circuitry implements a check of whether the predetermined condition is satisfied, to determine whether it is safe to process the early-issued predetermined type of predicated vector load micro-operation as a complete vector load if the predicate operand is still unavailable. Hence, the memory access circuitry may determine that the predetermined condition is satisfied for the predetermined type of predicated vector load micro-operation when the memory access circuitry determines that performing the complete vector load in response to the predetermined type of predicated vector load micro-operation would cause at least one address-dependent memory-access-related side-effect.

When the predetermined type of predicated vector load micro-operation is processed when the predicate operand is already available, the memory access circuitry suppresses the at least one address-dependent memory-access-related side-effect being caused by a load associated with an inactive vector element of the destination vector register indicated by the predicate operand. For example, the memory access circuitry may prevent a load request being issued for an address associated with an inactive vector element.

On the other hand, when the predetermined type of predicated vector load micro-operation is processed when the predicate operand is not yet available, the memory access circuitry may check whether the predetermined condition is satisfied before deciding whether to proceed with the complete vector load or reject the micro-operation back to the issue circuitry.

One example of an undesired address-dependent memory-access related side-effect is a fault caused by an access to a particular address. For example, a memory access may trigger a fault if no address translation mapping has been specified for that address, or if access permissions specified for that address are violated by the memory access. Fault handling may be extremely slow, and not expected by the program because the access is inactive, and so it may be undesirable to trigger an unnecessary fault due to a load performed for an inactive vector element of the destination vector register when that fault would not have occurred if the load for the inactive vector element had been suppressed based on the predicate operand. Therefore, the memory access circuitry can determine that the predetermined condition is satisfied for the predetermined type of predicated vector load micro-operation when the memory access circuitry determines based on the load target address that, if the complete vector load was performed, the complete vector load would cause a fault. Hence, if the predetermined type of predicated vector load micro-operation is issued early before the predicate operand is available and the memory access circuitry determines based on the load target address that a fault would be generated if the complete vector load was performed, the memory access circuitry rejects the operation and requests that the issue circuitry re-issues the predetermined type of predicated vector load micro-operation later, to give time for the predicate operand to be available. It may be that the fault would only have arisen due to an access associated with an inactive vector element (e.g. if the addresses corresponding to the elements of the vector have spanned beyond the end of the data structure being processed and into an unmapped region of memory), so that once the predicate operand is available then the access is associated with inactive vector elements can be suppressed to prevent the fault arising. Hence, it can be particularly useful for the predetermined condition to be a condition which indicates that a fault would arise if the complete vector load was performed.

Another example of a side-effect that could arise for an access to memory is when an access is made to a device region of memory address space allocated for communication with a device other than a memory storage device. Non-storage devices may be triggered to carry out actions by issuing a memory access request specifying an address mapped to that non-storage device. For example, such device accesses could trigger a buzzer to sound or could trigger a physical action such as, in an automotive vehicle, firing the passenger airbags. Also, such non-storage device accesses could be used to allocate a commands to a command queue for a non-storage device such as a hardware accelerator. With such device accesses, performing the same memory access to a given address more than once may have a noticeable difference in effect compared to performing the memory access only once (for example, the user notices that the horn of their car has beeped twice instead of once, or the hardware accelerator performs the action represented by the command multiple times instead of once). Hence, for device accesses it can be undesirable to speculatively issue a memory access request to the device region of memory when it is not known that the memory access request will be correct. Certain regions of the address space mapped to such non-storage devices may therefore be identified as device type of memory so that speculative issuing of memory accesses to those regions can be suppressed even in cases when such speculative issuing would have been acceptable if the address had been mapped to a region used for a memory storage device (for which reading the same data twice may have exactly the same effect from an architectural point of view as reading the data once). For the predetermined type of predicated vector load micro-operation, it can therefore be undesirable to allow a load request to be issued for an address mapped to the device type memory region in cases when it is not yet known based on the predicate operand whether that load request relates to an active vector element or an inactive vector element. Therefore, it can be useful for the predetermined condition to be considered satisfied if performing the complete vector load would cause an access to the device region of memory address space. In practice, often the predetermined type of predicated vector load micro-operation may be most useful for operations which act on data stored in non-device-type memory regions mapped to a memory storage device, so it may be relatively rare that the predetermined type of predicated vector load micro-operation targets a device region of memory.

Another cause of an undesired side-effect related to a memory access can be if a watchpoint has been set up for diagnostic purposes. A software developer can set a watchpoint address which represents an address in memory for which, when the processor issues a memory access to that address, a certain diagnostic operation should be triggered, such as halting processing to switch to a debug mode in which debug actions can be performed such as executing debug instructions or saving information about the current state of the processor, for example. It may be undesirable to trigger such diagnostic actions based on a speculatively executed memory access which turns out not to be needed. If the complete vector load was performed, there can be a risk that one of the accesses associated with an inactive vector element could trigger a watchpoint action, and this may unnecessarily interrupt processing if the access was not an architecturally required access because it should have been predicated based on the predicate operand. Therefore, it can also be useful for the predetermined condition evaluated by the memory access circuitry to determine that the predetermined condition is satisfied when performing the complete vector load would cause a memory access to an address defined as a watchpoint address for which a diagnostic operation is to be triggered when an access to the watchpoint address is requested. If the complete vector load would cause an access to the watchpoint address, then the memory access circuitry may reject the predetermined type of predicated vector load micro-operation until the predicate operand is available, at which point the predicate operand can be used to determine whether the access to the watchpoint address is associated with an active element (in which case the watchpoint operation can be triggered) or an inactive vector element (in which case the watchpoint operation is not necessary).

The predicated vector load micro-operation may have a number of variants. The predetermined type of predicated vector load micro-operation may be one variant supported by the processing circuitry. However, there can also be a second type of predicated vector load micro-operation, for which the issue circuitry may defer issuing the second type of predicated vector load micro-operation to the processing circuitry until the predicate operand is determined to meet the availability condition. For example, some types of program instruction which require a predicated vector load operation may be decoded into the predetermined type of predicated vector load micro-operation, and other types of program instruction may be decoded into the second type of predicated vector load micro-operation. Often, the scenarios in which it is likely to be possible to speculatively process the complete vector load when the predicate operand is not yet available can be identified in advance by the programmer or compiler writing the software, or may be implicit from a certain type of instruction requiring a predicated vector load, and so the decoding circuitry which decodes the instructions may be able to determine from the type of instruction is encountered whether it should generate the predetermined type of predicated vector load micro-operation to signal that it would be allowable to issue that micro-operation early without waiting for the predicate operand to meet the availability condition, or generate the second type of predicated vector load micro-operation to signal that the issue circuitry should control issue timing based on availability of the predicate operand.

The processing circuitry may also support a predicated vector store micro-operation specifying a store target address, a source vector register and a store predicate operand. The store predicate operand indicates whether each vector element of the source vector register is active or inactive. The source vector register is a register from which data from active vector elements is to be stored to memory locations associated with addresses identified based on the target address. For the predicated vector store micro-operation, the issue circuitry may defer issuing the predicated vector store micro-operation to the processing circuitry until the store predicate operand is determined to meet the availability condition. This recognises that, unlike the load, for a store the option to perform a full store operation assuming that all vector elements are active would not be considered appropriate because this may result in incorrect overwriting of some data in memory that should have been preserved if the predicate operand specified at least one inactive vector element. Therefore, while the predicated vector load micro-operation may have a predetermined type variant as discussed above which can be issued early and can be processed assuming all vector elements are active, for the predicated vector store micro-operation, issuing may be controlled based on availability of the store predicate operand.

The apparatus may have instruction decoding circuitry to decode instructions to generate the micro-operations to be issued to the processing circuitry. In one example, in response to decoding a predicated-loop-body instruction, the instruction decoding circuitry may generate a plurality of micro-operations for controlling the processing circuitry to perform an iteration of a predicated loop body comprising: determining a variable number of bytes to be processed in the iteration; performing a predicated vector load operation predicated based on the variable number of bytes; performing at least one further predicated operation which is dependent on the predicated vector load operation and is predicated based on the variable number of bytes; and updating, based on the variable number of bytes, a remaining bytes parameter indicative of a number of bytes remaining to be processed. In response to decoding the predicated-loop-body instruction, the instruction decoding circuitry may generate the predetermined type of predicated vector load micro-operation for performing the predicated vector load operation of the predicated loop body.

This recognises that in such a predicated loop body, even if the predicated vector load operation loads too many bytes of data because it is performing loads for inactive vector elements when the predicate operand was not available yet, the at least one further predicated operation may in any case suppress processing of the incorrectly loaded data because it is also predicated based on the variable number of bytes determined for the predicated loop body. Hence, the predetermined type of predicated vector load micro-operation can be particularly useful for a predicated-loop-body instruction as discussed above.

The at least one further predicated operation could, for example, be predicated vector store operation or a predicated vector compare operation.

In some instances, in response to the predicated-loop-body instruction, the instruction decoding circuitry may generate at least one micro-operation to control the processing circuitry to determine the variable number of bytes based on alignment, with respect to an alignment boundary, of at least one of: a load target address of the predicated vector load operation; and (where the at least one further predicated operation is a predicated vector store operation) a store target address of the predicated vector store operation. When the determination of the variable number of bytes depends on address alignment, then setting the predicate operand for the predicated vector load operation may be relatively slow, and so the predetermined type of predicated vector load micro-operation can be particularly useful in cases where, within the predicated loop body, there is an operation to determine the variable number of bytes based on address alignment. The variable number of bytes can also depend on the remaining bytes parameter. For example, the variable number of bytes can be determined to not exceed the number of remaining bytes indicated by the remaining bytes parameter. Also, the variable number of bytes may depend on a vector size to be used for the predicated vector load operation. The predicate operand for the predicated vector load operation can be generated based on the determined variable number of bytes.

Also, the iteration of the predicated loop body may include updating a load target address for the predicated vector load operation. The load target address can be incremented based on the number of bytes processed in the current iteration of the predicated loop body. Often, this may be the total number of bytes that fit within the vector being loaded, if the number of remaining bytes to be processed is greater than the number of bytes corresponding to the size of the vector. However, on some iterations the number of bytes processed may be smaller than the number of bytes corresponding to the size of the vector. For example, this could occur if address alignment considerations mean that it is preferable to process fewer bytes in a given iteration so that the load target address (or a store target address if the at least one further predicated operation is a predicated vector store operation) for the next iteration becomes an aligned address to make subsequent iterations more efficient. Also, on the final loop iteration the number of bytes remaining to be processed may not be enough to fill a complete vector and so the variable number of bytes may be less than the number of bytes corresponding to the vector size.

In some cases, the iteration of the predicated loop body may also comprise controlling whether a further iteration of the predicated loop body is to be performed, based on whether a loop is satisfied by the remaining bytes parameter. Hence, in some cases the predicated-loop-body instruction could also implement a conditional branch operation dependent on the loop termination condition. However, such a branch is not essential and in other implementations the predicated-loop-body instruction could not perform a branch, with the branch which controls iteration of a further pass through the loop instead being implemented as a separate instruction from the predicated-loop-body instruction.

In other examples, the functions of the predicated loop body described above could be implemented as separate program instructions (rather than as a single predicated-loop-body instruction which is cracked into separate micro-operations by the instruction decoding circuitry). Hence, other implementations may define a particular type of predicated vector load instruction which, when decoded, is decoded into the predetermined type of predicated vector load micro-operation. Other types of predicated vector load instruction being decoded into a second type of predicated vector load micro-operation which is not allowed to be executed early with the predicate still unavailable.

The predetermined type of predicated vector load micro-operation can be particularly useful for implementing certain string processing library functions defined in the string.h header file of the C programming language. String.h is a library which provides a certain group of functions for manipulating strings stored in memory, where a string is a sequence of text characters. These functions can include memcpy (a function to copy a string from one region of memory to another), memcmp (a function to compare two strings), strchr (a function to search for the first occurrence of a specified character within a given string loaded from memory), strlen (a function to determine the length of a specified string variable, e.g. by searching for the first byte equal to 0 after a particular address in memory), and so on. Such functions can seem apparently simple to the software developer, but can be relatively performance intensive when compiled into the machine code which will actually be executed by the processor. In the compiled code, these functions may be implemented by using a predicated loop body similar to the one discussed above, including use of a predicated vector load micro-operation. In some software applications, a relatively large fraction of processing time can be taken up by such string processing functions. As each instance of calling the string.h processing function may lead to multiple iterations of the predicated loop body being performed and each program loop body may include the determination of the predicate for the vector load based on the variable number of bytes determined based on address alignment with the load, across a software application as a whole the performance saving from allowing the predicated load operation to issue early before the predicate operand has met its availability condition can be significant. Therefore, it can be particularly useful for the predetermined type of predicated vector load micro-operation to be used for an instruction which is for implementing a string.h C library function which acts on a string stored in memory.

One particular example of a string.h library function for which the predetermined type of predicated vector load micro-operation can be particularly useful is the memcpy function, which copies a variable number of bytes of data from first memory region to a second memory region. Memcpy operations are very common in some software applications, and can be slow to process as they can be implemented using a predicated load (predicated based on the variable number of bytes determined based on address alignment, for example) followed by a predicated store operation dependent on the predicated load. The store cannot be processed until the load has been processed. Any delays to the load will therefore delay the store as well. By allowing the load to start early even if its predicate operand is not available yet, performance can be improved, and the benefit can be seen on each iteration of a loop associated with the memcpy operation, and on each memcpy operation arising in the application as a whole. Hence, it can be particularly useful for the instruction decoding circuitry to generate the predetermined type of predicated vector load micro-operation in response to a memory copy instruction for copying data from a first memory region to a second memory region.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. A memory management unit (MMU) 28 is provided to perform memory management operations such as address translation and checking of memory access permissions. The address translation mappings and access permissions may be defined in page table structures stored in the memory system. Information from the page table structures can be cached in a translation lookaside buffer (TLB) provided in the MMU 28.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

As shown in FIG. 1, the apparatus 2 includes a branch predictor 40 for predicting outcomes of branch instructions. The branch predictor is looked up based on addresses of instructions to be fetched by the fetch stage 6 and provides a prediction of whether those instructions are predicted to include branch instructions, and for any predicted branch instructions, a prediction of their branch properties such as a branch type, branch target address and branch direction (the branch direction indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios. Branch misprediction detection circuitry 46 detects, based on outcomes of branch instructions executed by the branch unit 24, whether a branch has been mispredicted, and controls the pipeline 4 to suppress effects of the mispredicted branch instruction and cause execution of instructions to resume based on the correct branch outcome (e.g. by flushing operations that are younger than the branch in program order and resuming fetching from the instruction that should be executed after the branch). The prediction state data in the BTB 42 and branch direction predictor 44 is also trained based on the outcomes of executed branch instructions detected by branch misprediction detection circuitry 46.

The apparatus also has exception handling circuitry 50 to detect causes of exceptions, such as faults caused by memory accesses, attempts to execute undefined instructions, security violation faults, external interrupts, etc. When an exception arises, processing is interrupted and the exception handling circuitry 50 causes the processing pipeline 4 to switch to executing instructions from an exception handler associated with the particular type of exception that occurred. When the exception handler completes, processing can return to the processing that was being performed before the exception occurred.

The decode stage 10, issue stage 12 and execute stage 16 are an example of the instruction decoding circuitry, issue circuitry and processing circuitry mentioned earlier. The load/store unit 26 is an example of the memory access circuitry mentioned earlier.

Figure 2:
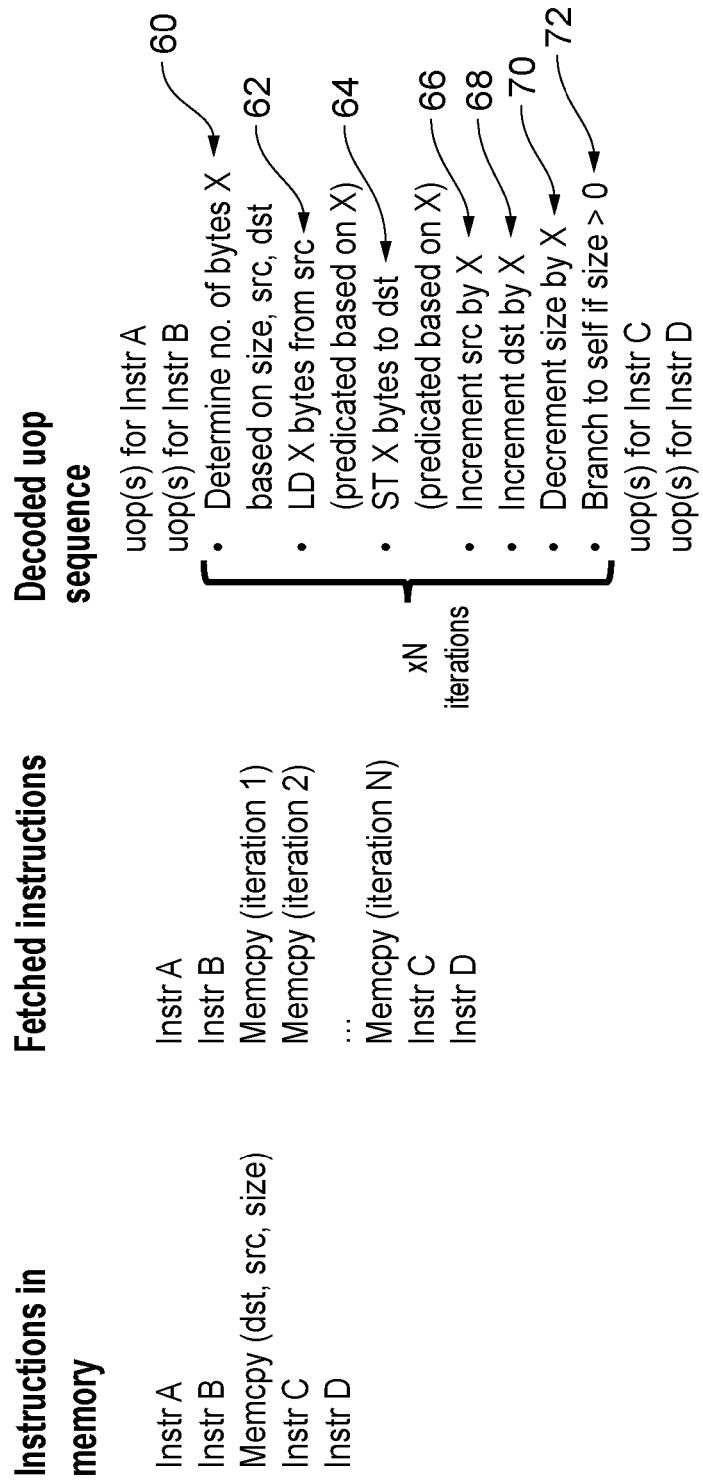
FIG. 2 illustrates an example of executing code including a memory copy (memcpy) instruction.

FIG. 2 illustrates processing of a memory copy instruction for copying data from a first memory region to a second memory region. The memory copy instruction is a particular example of a predicated-loop-body instruction as mentioned earlier. The memory copy instruction specifies a source address src identifying the first region of memory and a destination address dst identifying the second region of memory, as well as specifying a size parameter which identifies the number of bytes of data to be copied from the first region of memory to the second region of memory. The left-hand portion of FIG. 2 shows a sequence of program instructions as they would be stored in memory prior to being fetched by the fetch stage 6. A single instance of the memory copy instruction is included surrounded by a certain number of other instructions.

Although the size parameter of the memory copy instruction may specify a certain total number of bytes to be copied, that size may be greater than the maximum number of bytes that can be copied in a single instance of executing the memory copy instruction, and so the memory copy instruction may be interpreted as an implicit branch instruction which, if the number of bytes copied in response to a particular instance of the memory copy instruction is such that there are still some bytes remaining of the total number of bytes to be copied, then the memory copy instruction triggers a branch to itself, so that a further instance of the memory copy instruction is executed to represent a further iteration of a predicated loop (the size parameter can be decremented by the number of bytes processed on each iteration of the memory copy instruction to track how many bytes remain to be processed, and the source/destination addresses of the memory copy instruction can be incremented by the number of bytes processed so that each iteration of the memory copy instruction moves onto the next chunk of data in memory after the chunk processed in the previous iteration).

Note that, in the fetched instruction sequence as shown in the middle portion of FIG. 2, all of the instances of the memory copy instruction shown are actually different fetched instances of the same instruction fetched from the same instruction address. The branch predictor 40 can predict how many iterations of the memory copy instruction will be required before the loop terminates, so that it can control the fetch stage 6 to fetch the memory copy instruction the predicted number of times before moving onto the next instruction after the memory copy instruction. For example, the branch predictor 40 could maintain a prediction structure tracking, for particular instruction addresses of instructions previously identified to be the memory copy instruction, how many iterations were actually required before the loop terminated, so that subsequent instances of the memory copy instruction at that address can be predicted to require a similar number of iterations. If the number of iterations of the memory copy instruction is mispredicted, the branch misprediction detection circuitry 46 may trigger a flush of incorrectly scheduled micro-operations which should no longer be executed, and control the pipeline 4 to resume fetching operations from after the mispredicted branch, including fetching more instances of the memory copy instructions if required.

The right-hand portion of FIG. 2 illustrates a decoded sequence of micro-operations corresponding to the fetched instruction sequence shown in the middle part of FIG. 2. For a given instance of fetching the memory copy instruction for a particular iteration of the memory copy loop, that instance of the memory copy instruction is mapped to a group of multiple micro-operations 60-72 which collectively implement a single iteration of the memory copy loop. Hence, in the example shown in FIG. 2 where N iterations of the memory copy loop are required, there will be N sets of the group of micro-operations illustrated with the bracket (FIG. 2 only shows one iteration of these micro-operations for conciseness).

The micro-operations generated for a particular iteration of the memory copy loop include at least one micro-operation 60 to determine a variable number of bytes X based on the size parameter, the source address and/or the destination address (while FIG. 2 shows a single micro-operation 60, other implementations may need more than one micro-operation to assess the addresses and calculate the number of bytes). The number of bytes X may be selected so as to not exceed the number of bytes indicated by the size parameter, which may indicate a maximum number of bytes allowed to be copied in response to the current iteration of the memory copy loop. However, the micro-architecture of the processing circuitry 16 may have the flexibility to vary the number of bytes X selected, depending on micro-architectural implementation choice. In general, the particular value selected for X can vary from implementation to implementation (e.g. some implementations may support a greater maximum size for X than others) and between different iterations of the memory copy loop, even when all the operands (destination address, source address, size) are the same. This flexibility is possible because the update made to the size parameter and source/destination memory addresses in response to the current iteration of the predicated loop will account for the number of bytes that have actually been copied and then this will cause the operation of subsequent iterations of the memory copy loop to be adjusted accordingly so that the overall effect of the loop as a whole can be the same even if the particular number of bytes processed in a particular iteration varies.

For example, the variable number of bytes X could be determined based on the alignment of the source address and/or the destination address with respect to an address alignment boundary. The memory system 34 may be able to handle memory accesses more efficiently if a request is made specifying an address which is aligned to an address alignment boundary than when an unaligned access to a block of data which spans an address alignment boundary is requested. This is because some internal control mechanisms of the memory system, such as control logic and queues associated with a cache, interconnect or memory controller, may assume that requests specify an address aligned to an address boundary corresponding to an address block of a certain size such as a certain power of 2 number of bytes, and so if a block of data crossing such an address alignment boundary has to be accessed, then the load/store circuitry 26 may split the memory access into a number of separate requests each specifying a portion of data which does not cross the address alignment boundary.

For the memory copy loop, if the source/destination address is unaligned for the first iteration of the memory copy loop, and each iteration selects as the number of bytes X the maximum possible number of bytes that can be processed in one iteration, the source/destination address after the update performed in that iteration may still be unaligned, so the next iteration would then also make an unaligned access. Hence, if each iteration requires an unaligned access, this may increase the overall number of requests that need to be made the memory system because on each iteration of the memory copy loop an access to an unaligned block may require multiple separate memory access requests to be issued to memory. In contrast, if most iterations of the memory copy instruction can perform an aligned access then this may only require one memory access request to be issued per iteration, which can reduce the total amount of memory bandwidth consumed by the accesses to memory and hence improve performance.

Therefore, it can be useful on the first iteration of the memory copy loop, if the source address or destination address is unaligned, to select the variable number of bytes X so that, even if the hardware would be capable of handling an access to a greater number of bytes in the current iteration, X is selected so that for a subsequent iteration of the memory copy loop at least one of the source address and the destination address becomes an aligned address aligned to an address alignment boundary. For example, X may be selected based on the difference between the source address and the address representing the next address alignment boundary after the source address, or based on the difference between the destination address and the address representing the next address alignment boundary after the destination address. In cases where the alignment of the source address relative to an address alignment boundary is different compared to the alignment of the destination address relative to an address alignment boundary, it may not be possible to align both the source and destination addresses to the alignment boundary for the next iteration of the memory copy loop, and so in that case some implementations may choose to prioritise the load alignment and other implementations may choose to prioritise the store alignment.

Figure 3:
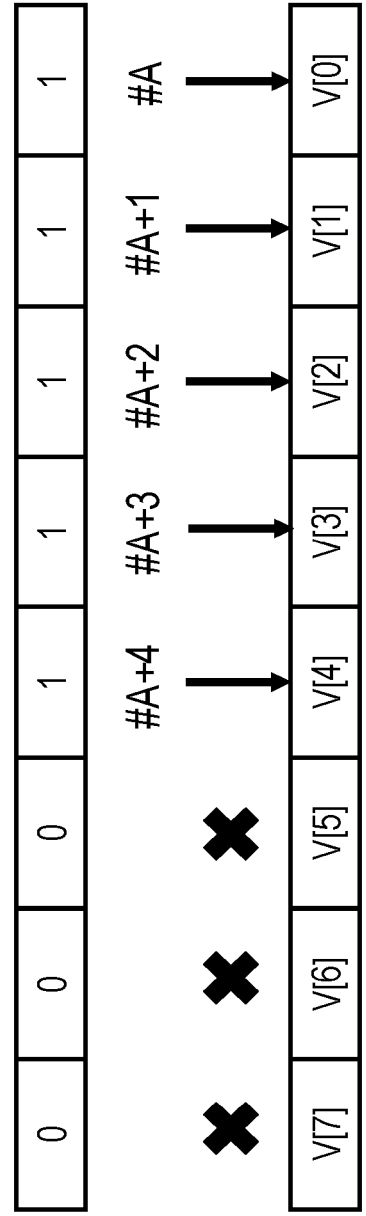
FIG. 3 illustrates an example of a predicated load micro-operation.

Also, the micro-operations generated for a particular memory copy instruction iteration include a predicated vector load micro-operation 62 which loads a destination vector register with at least X bytes of data obtained from memory system locations identified based on the source address src. FIG. 3 illustrates an example of the predicated vector load micro-operation 62. The destination register of the load micro-operation comprises a number of vector elements (e.g. 8 vector elements V[0] to V[7] in this particular example), and the source address src (assumed to be equal to #A in this example) identifies the data to be loaded to the first of the vector elements, V[0], with the subsequent vector elements being loaded with data associated with addresses which are generated by applying successive address increments to the address #A specified by the source address parameter. In this example, the increment between the addresses associated with two adjacent vector elements is 1 byte, but it would also be possible for predicates to be applied at a granularity larger than 1 byte. The predicate operand specifies which vector elements are active and which vector elements are inactive. For example, the predicate can be represented as a mask for which bit values equal to 1 indicate the positions of the active vector elements in the destination register and bit values equal to 0 indicate the positions of the inactive vector elements. In this example, the first five elements of the vector are active and the remaining three elements are inactive, indicating that vector elements V[5] to V[7] should have the corresponding load operations suppressed. Hence, if the micro-operation 60 had determined that the number of bytes X to load equals 5 then the predicate could be generated as shown in FIG. 3 to indicate that 5 bytes of data should be loaded to the first five elements of the vector.

As shown in FIG. 2, the set of micro-operations generated for a given memory copy instruction also includes a predicated vector store micro-operation 64 which stores the variable number X of bytes from a source register (which can be specified to match the destination register used by the load micro-operation 62) to memory system locations identified based on the destination address (again, the address corresponding to each vector element of the source vector register can be identified based on applying address increments to the destination address). Similar to the load micro-operation shown in FIG. 3, a predicate operand can be generated to predicate the store operations and ensure that the data from active elements of the store source register are saved to memory while store operations are suppressed for the inactive vector elements. The number of active elements indicated by the predicate operand may be determined based on the number of bytes X determined by micro-operation 60. The store micro-operation 64 may share the same predicate operand as the load micro-operation 62.

Hence, the combination of the load micro-operation 62 and the store micro-operation 64 can implement the required memory copy operation to copy X bytes of data from the source memory region to the destination memory region. The loop of decoded micro-operations then includes a number of micro-operations for maintaining the address and size parameters of the memory copy instruction to account for the number of bytes of data which have already been processed. Micro-operations 66, 68 increment the source address and the destination address respectively by X, the copied number of bytes, so that the source and destination addresses for a subsequent iteration of the memory copy loop will be advanced in memory by X bytes. Also, micro-operation 70 is generated which causes the size parameter of the memory copy instruction to be decremented by X, so that the number of bytes of data remaining to be copied can be indicated to be X bytes fewer than was the case for the current iteration.

The set of micro-operations for a given instance of the memory copy instruction also includes a branch micro-operation 72 which may perform a conditional branch to the instruction address of the memory copy instruction itself, with the branch being taken if the size parameter after the update performed by micro-operation 70 is greater than 0 and the branch being not taken if the size parameter is 0. Although not shown in FIG. 2 for conciseness, in some instruction set architectures there may also be a need for an intervening compare instruction between micro-operation 70, 72 to compare the size parameter with 0 and set a condition status flag accordingly, which the branch micro-operation 72 can used to determine whether to take the branch.

Hence, each iteration of the memory copy loop may perform the memory copy operation for a certain number of bytes X which is limited, as a maximum, to the number of bytes indicated by the size parameter but is allowed to be smaller, and then the required number of bytes are copied from source region of memory to a destination region of memory and the addresses and size parameter are updated accordingly and if it is still necessary to perform a further iteration of the loop because there is at least one remaining bytes to be copied then a branch to the memory copy instruction itself is triggered. In other examples, the operations indicated by micro-operations 60-72 could have been represented by separate program instructions in the representation of the program stored in memory, rather than being cracked by the instruction decoder 10 from a single memory copy instruction.

Memory copy (memcpy) functions are one example where such a predicated loop of operations can be useful. However, there are also other library functions in programming languages such as C for which a similar technique can be useful. For example, the string.h C library functions for string processing can be implemented using a similar iterative technique where a certain operation is performed on a variable number of bytes and a loop is iterated a number of times until the required number of bytes have been processed. In the memory copy example, the predicated vector load micro-operation 62 is followed by a predicated vector store micro-operation 64, but other string processing functions could have a different operation after the predicated vector load micro-operation 62.

For example, the memcmp( ) function, which is for comparing N bytes of two strings to determine whether they are the same, may provide a predicated vector compare micro-operation instead of the vector store micro-operation 64. The predicated vector compare operation may perform an element-by-element comparison of the vector loaded by the load micro-operation 62 with a second vector representing a string to be compared (e.g. each element of the two vectors may represent one character of the respective strings), and a comparison result may be set depending on the comparison outcomes of each pair of active elements within the two vectors (and depending on the comparison outcome of any preceding iteration of the loop). A predicate operand (generated based on the variable number of bytes determined at micro-operation 60) can be used to ensure that the comparison outcomes for any inactive elements do not contribute to the comparison results.

Another example of a string processing function which could use a similar approach is the strlen( ) function which detects the length of string stored at a particular region of memory, by loading the string from memory and searching for the position of the first byte of data having a value of 0 after the start of the string. This can be implemented using a loop as shown in FIG. 2 where the vector load 62 loads a portion of the string from memory and a subsequent vector comparison instruction performed instead of the store micro-operation 64 compares each of the loaded bytes of data against 0. Again, a predicate operand can be used to predicate the load operation so that the number of bytes X processed in a given iteration may be selected so as to cause the source address for the next iteration to be an aligned address to improve performance, and this predicate operand may then also predicate the subsequent compare micro-operation to ensure that the overall comparison results does not incorrectly depend on data within an inactive element of the vector.

It will be appreciated that these are only some examples of processing functions which could use the technique discussed below.

For a predicated vector load micro-operation such as the one shown in FIG. 3, one would expect that normally any load operations associated with inactive elements of the vector should be suppressed. For example, in FIG. 3 the memory accesses to addresses #A+5, #A+6, #A+7 corresponding to element positions 5, 6 and 7 of the destination vector register may not be performed.

However, the inventor recognised that, when the vector load micro-operation 62 is used in a scenario such as the one shown in FIG. 2, where it forms part of a predicated loop body for which each iteration of the predicated loop body also includes a subsequent predicated micro-operation 64 which will use the same predicate operand and will not process the portions of the loaded vector corresponding to inactive vector elements, and where the generation of the predicate may depend on data-dependent operands of an earlier micro-operation 60, allowing the predicated vector load micro-operation 62 to speculatively execute assuming that all vector elements are active elements so that a complete vector load is performed may in the majority of cases not change the processing outcome of the predicated loop body 60-72. Hence, it can be useful to support a predetermined type of predicated vector load micro-operation which is allowed to be issued by the issue circuitry 12 even if the predicate operand is not yet determined to meet an availability condition. This type of predicated vector load micro-operation can be selected by the instruction decoder 10 when decoding a predicated-loop-body instruction such as the memory copy instruction shown in the example of FIG. 2, but could also be used on other occasions. The instruction decoder 10 may also support a second type of predicated vector load micro-operation which is not allowed to be issued by the issue circuitry 12 until its predicate operand has been determined to meet its availability condition. Hence, which particular type of predicated vector load micro-operation is selected may depend on the type of instruction fetched from memory.

There are some (relatively rarely occurring) conditions when performing unnecessary accesses to memory may trigger an address-dependent memory-access-related side-effect. One example of such a side-effect is if an access to one of the addresses corresponding to an inactive data element would have caused the MMU 28 to signal a fault (e.g. because the corresponding address did not have a corresponding page table entry defined, or because the corresponding page table entry for the address specified access permissions indicating that the access is not allowed). Another example of such a side-effect is if the address indicated by the source address operand src of the load is mapped to device type memory, which is a type of memory region allocated for a memory system device which does not provide data storage but instead provides other functions, such as hardware acceleration, control of a peripheral device, control of the display device or network interface, etc. For device type of memory accesses, it can be undesirable to speculatively issue a memory access because a device type access may trigger a physical action noticeable to the user or may lead to commands being actioned too many times. Hence, for device type memory it can be unacceptable to speculatively perform a memory access when it is not yet known whether it will be correct, due to the risk of undesired side effects of that access. Another example of a possible side effect of the memory access may be the triggering of the watchpoint action when a memory access is made to an address previously defined as a watchpoint address by a system developer who is performing a diagnostic analysis such as debugging. When a memory access to the watchpoint address is triggered, the processing being performed by the processing pipeline 4 may temporarily be halted to allow a debugger to step in and perform a diagnostic action such as examining the contents of registers or injecting some debug instructions to be executed by the execute stage 16, before returning to execution of the next instruction of the actual program being executed.

Hence, when the issue circuitry 12 issues the predetermined type of predicated vector load micro-operation early, so that it reaches the relevant stage of the load/store circuitry 26 at a time when the predicate operand is not yet available, the load/store circuitry 26 may check whether a predetermined condition is satisfied which indicates that one of these address-dependent memory-access-related side-effects could arise. If the predetermined condition is not satisfied then the load/store circuitry 26 can process the predicated vector load micro-operation assuming that all the vector elements of the destination register are active, and so may issue a memory access request to request a complete vector load of all the data that would be required to be loaded if the predicate operand when available indicates that all elements are active. Even if the predicate operand subsequently becomes available and indicates some elements are inactive, provided the predetermined condition is not satisfied, it is not necessary to flush the load request or subsequent operations from the pipeline, because the subsequent predicated micro-operation 64 (e.g. a store in FIG. 2, but it could also be other types of operation such as a compare) will in any case not process the incorrectly loaded elements and so the overall result may be the same as if the micro-operation had waited for the predicate to be available before being processed. By issuing and processing the predicated vector load micro-operation early, this removes the latency associated with determining the number of bytes X using micro-operation 60 from the critical timing path, hence improving performance.

Figure 4:
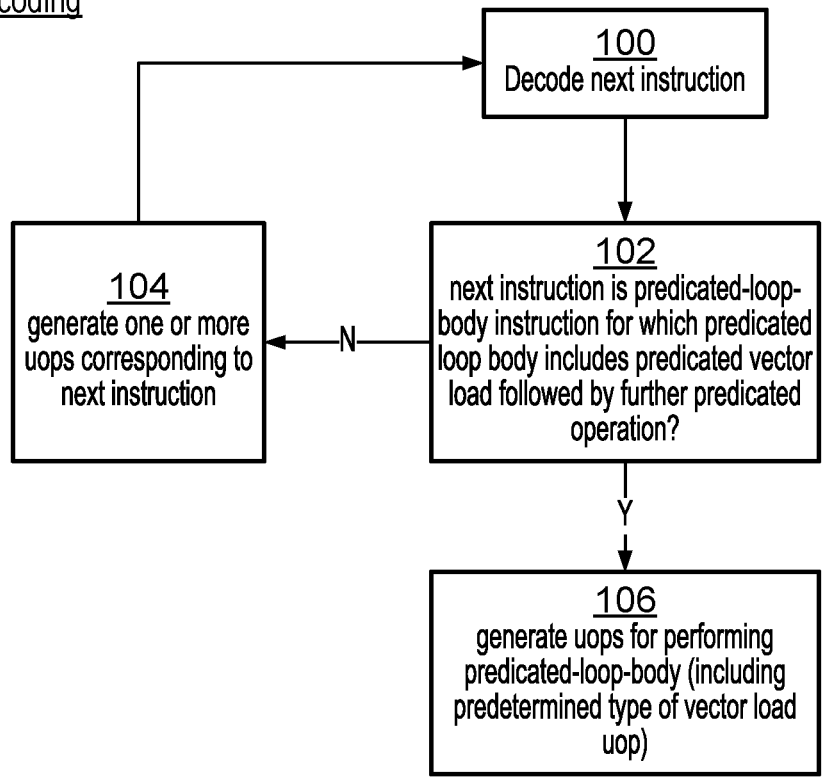
FIG. 4 is a flow diagram illustrating a method of decoding instructions.

FIG. 4 is a flow diagram illustrating steps performed by the instruction decoding circuitry 10 when decoding instructions fetched for processing. At step 100 the instruction decoding circuitry 10 checks the encoding of the next instruction received from the fetch stage 8 to identify the operations that need to be performed. At step 102 the instruction decoding circuitry 10 checks whether the encoding indicates that the next instruction is a predicated-loop-body instruction for which micro-operations (uops) are to be generated to control the execute stage 16 to perform a predicated loop body which includes a predicated vector load operation followed by at least one further predicated operation which shares the same predicate as the predicated vector load. If the next instruction is such a predicated-loop-body instruction, then at step 106 the instruction decoding circuitry 10 generates micro-operations 60-72 for performing the predicated loop body, with those micro-operations including the predetermined type of vector load micro-operation discussed above. If the next instruction is not the predicated-loop-body instruction, then at step 104 one or more micro-operations corresponding to the next instruction are generated. In particular, for at least one type of other instruction at step 104 the generated micro-operations may include the second type of vector load micro-operation which is not allowed to be issued early.

Figure 5:
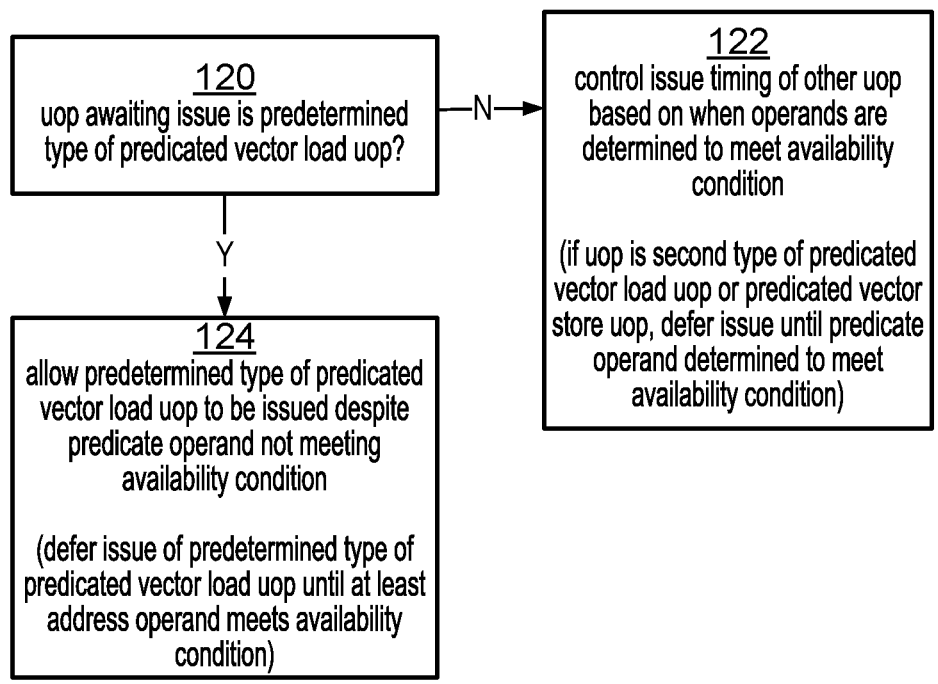
FIG. 5 is a flow diagram showing a method of controlling issuing of micro-operations.

FIG. 5 is a flow diagram illustrating steps performed by the issue circuitry 12 to control issuing of a micro-operation awaiting processing by the execute stage 16 (a separate instance of the steps of FIG. 5 may be performed for each micro-operation awaiting issue). At step 120 the issue circuitry 12 checks a micro-operation which is queued awaiting issue. If the micro-operation awaiting issue is a micro-operation other than the predetermined type of predicated vector load micro-operation, then at step 122 the timing of issuing that other micro-operation is determined based on when its operands are determined to meet an availability condition. For each operand, the availability condition could be a determination that the operand is already available, or could be a condition which indicates that the operand will be available by the time the micro-operation reaches the stage at which the operand is needed. If the micro-operation being considered is the second type of predicated vector load micro-operation or a predicated vector store micro-operation, then at step 122 issuing of that micro-operation is deferred until the predicate operand is determined to meet the availability condition. If at step 120 the micro-operation awaiting issue is determined to be the predetermined type of predicated vector load micro-operation, then at step 124 the issue circuitry 12 allows the predetermined type of predicated vector load micro-operation to be issued despite the predicate operand not meeting the availability condition. The issue timing may still depend on any other operands of the predicated vector load micro-operation, such as the address operand of the vector load, meeting the availability condition, but can be independent of whether or not the predicate operand meets the availability condition. Hence, the predicated vector load micro-operation can be issued earlier than would be the case if it had to wait for the predicate operand to meet the availability condition.

Figure 6:
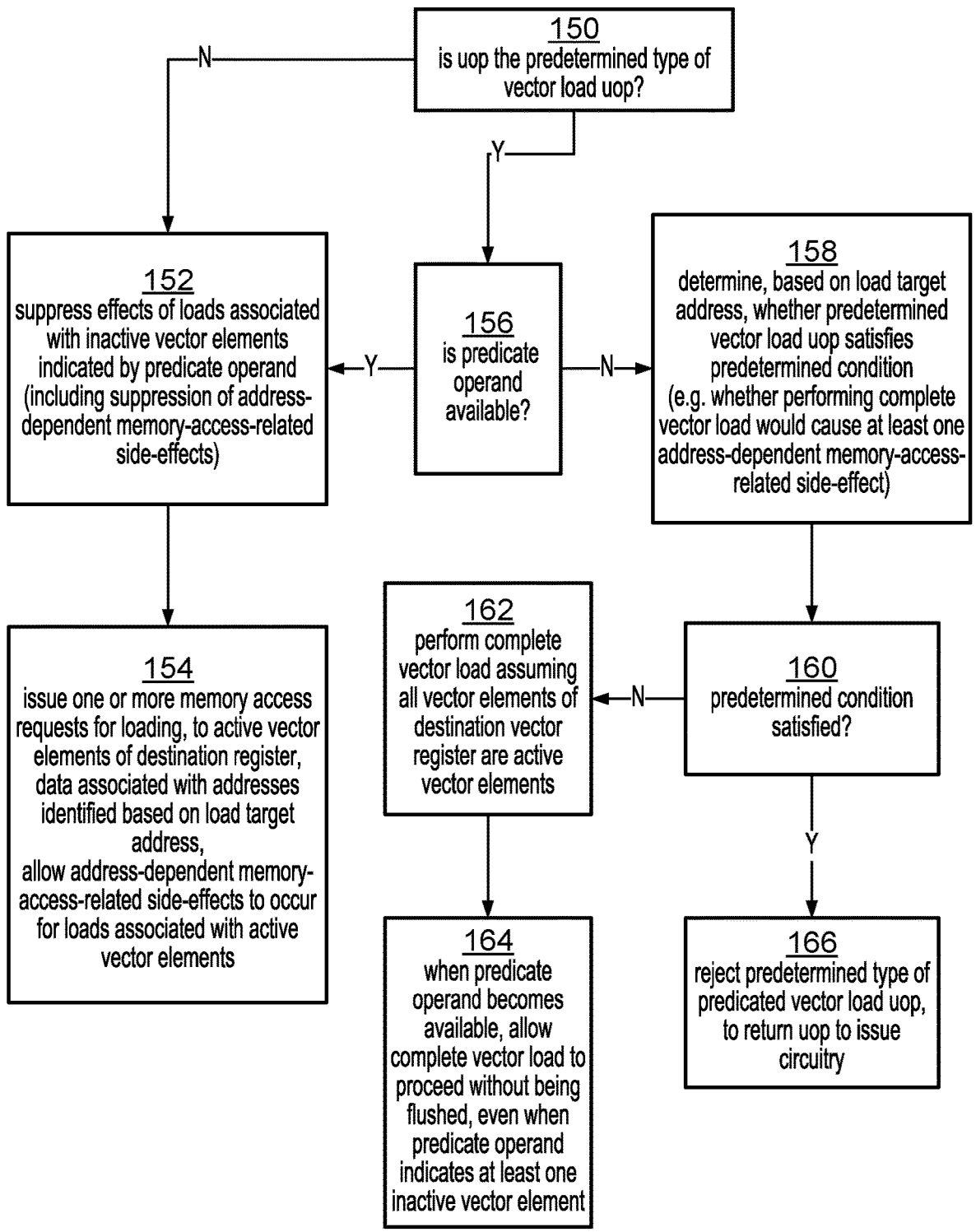
FIG. 6 is a flow diagram illustrating processing of a predicated vector load micro-operation.

FIG. 6 is a flow diagram illustrating processing of a predicated vector load micro-operation by the load/store circuitry 26. At step 150 the load/store circuitry 26 determines the type of vector load micro-operation encountered. If the predicated vector load micro-operation is not the predetermined type (e.g. the micro-operation is the second type of vector load micro-operation described earlier) then the predicate operand should be available for use by the load/store circuitry 26, because for predicated vector load micro-operations other than the predetermined type, the issue circuitry 12 would not have issued the predicated vector load micro-operation until the predicate operand is determined to meet the availability condition. At step 152 the load/store circuitry suppresses effects of loads associated with inactive vector elements indicated by the predicate operand (including suppression of any address-dependent memory-access-related side-effects), for example by not issuing any load request specifying that data associated with the corresponding addresses is to be loaded from memory. At step 154 the load/store circuitry issues one or more memory access request to the memory system, requesting that active vector elements of the destination register are loaded with data associated with addresses identified based on the load target address. Any address-dependent memory-access-related side-effects are allowed to occur for the loads associated with the active vector elements, because these are loads which are architecturally required to be performed.

On the other hand, if at step 150 the micro-operation being processed is determined to be the predetermined type of vector load micro-operation, then at step 156 the load/store circuitry 26 determines whether the predicate operand is available. If the predicate operand is available then the method continues to steps 152 and 154 to process the predetermined type of vector load micro-operation in the same way as if it had been another type of vector load micro-operation.

However, if the predicate operand is not yet available then at step 158 the load/store circuitry triggers an action to determine, based on the load target address, whether the predetermined type of vector load micro-operation satisfies a predetermined condition (indicating that performing a complete vector load would cause at least one address-dependent memory-access-related side-effect). For example, the load/store circuitry may control the MMU 28 to perform a lookup of the load target address in a TLB or page table structure to determine whether an address mapping has been defined for the load target address and if a mapping has been defined, to determine whether any memory access permissions specified for that address are satisfied by the current memory access. If either the page corresponding to the load target address is unmapped, or the access permissions specified for that page are violated, then it may be determined that continuing with a complete vector load would cause a side-effect since a fault would be generated. As this fault may not have been required if the predicate operand had been available, since it is possible the fault may only be associated with one of the inactive elements, then it is preferable to wait for the predicate to be available before continuing with the memory access. Hence, in one example the predetermined condition may be considered to be satisfied if, based on the load target address, the load/store circuitry 26 identifies that continuing with the memory access could trigger a fault if a complete vector load was performed. Similarly, if the lookup performed by the MMU 28 indicates that the load target address is mapped to device type memory then the predetermined condition be considered satisfied, to avoid triggering a device-related side-effect due to a memory access associated with an inactive vector element which should not actually have been performed. Also, the load/store circuitry may check any watchpoint addresses that have been defined for diagnostic purposes, and if any of the block of memory addresses corresponding to the vector operand as a whole, as determined from the load target address, match any defined watchpoint address then the predetermined condition may be determined to be satisfied, to avoid unnecessary watchpoint actions being triggered by a memory access which turns out not to be needed.

At step 160, the load/store circuitry determines whether the result of the action triggered at step 158 indicates that the predetermined condition is satisfied. If the predetermined condition is not satisfied (indicating that an address-dependent memory-access-related side-effect would not occur as a result of the complete vector load being performed), then at step 162 the load/store circuitry issues one or more memory access requests to cause a complete vector load operation to be performed assuming that all vector elements of the destination vector register are active vector elements. At step 164, when the predicate operand subsequently becomes available, then even when the predicate operand indicates at least one inactive vector element, the complete vector load is allowed to proceed without being flushed. Hence, there is no need to trigger an action for recovering from a misprediction or mis-speculation, because for the predetermined type of vector load micro-operation it is expected that a subsequent operation will be predicated to avoid processing the incorrectly loaded elements. This allows performance to be improved because, by using the predetermined type of vector load micro-operation, the load was able to be issued earlier, allowing memory accesses to be initiated sooner than would otherwise be possible, as the latency associated with processing the micro-operation(s) 60 for determining the number of bytes to be loaded and setting the predicate can be brought off the critical timing path.

On the other hand, if at step 160 the predetermined condition was determined to be satisfied, then at step 166 the load/store circuitry 26 rejects the predetermined type of predicated vector load micro-operation, so that the micro-operation returns to the queue of micro-operations awaiting issue at the issue stage 12. The issue stage 12 may then determine to re-issue the micro-operation again later. In some implementations the issue stage 12 may simply blindly reissue the micro-operation without considering the timing of availability of the predicate operand. However, more sophisticated implementations may, once the predetermined type of predicated vector load micro-operation has been rejected once by the load/store circuitry, consider the timing of availability of the predicate operand for the second attempt at issuing the predetermined type of predicated vector load micro-operation, so that the issue stage 12 may re-issue the micro-operation when the predicate operand is determined to meet the availability condition.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
processing circuitry to perform data processing in response to micro-operations decoded from instructions, the processing circuitry comprising memory access circuitry to control issuing of memory access requests; and
issue circuitry to control issuing of the micro-operations to the processing circuitry based on whether operands of the micro-operations meet an availability condition; in which:
in response to a predicated vector load micro-operation specifying a load target address, a destination vector register for which active vector elements of the destination vector register are to be loaded with data associated with addresses identified based on the load target address, and a predicate operand indicative of whether each vector element of the destination vector register is active or inactive:
when the predicated vector load micro-operation is a predetermined type of predicated vector load micro-operation, the issue circuitry is capable of issuing the predetermined type of predicated vector load micro-operation to the processing circuitry before the predicate operand is determined to meet the availability condition; and
when the predetermined type of predicated vector load micro-operation is issued to the processing circuitry before the predicate operand meets the availability condition, the memory access circuitry is configured to:
determine, based on the load target address, whether the predetermined type of predicated vector load micro-operation satisfies a predetermined condition; and
in response to determining that the predetermined condition is unsatisfied for the predetermined type of predicated vector load micro-operation, perform a complete vector load assuming all vector elements of the destination vector register are active vector elements, independent of whether the predicate operand when available identifies any inactive vector element of the destination vector register.

2. The apparatus according to claim 1, in which:
in response to the memory access circuitry determining that the predetermined condition is satisfied when the predetermined type of predicated vector load micro-operation is issued to the processing circuitry before the predicate operand meets the availability condition, the memory access circuitry is configured to reject the predetermined type of predicated vector load micro-operation and the issue circuitry is configured to re-issue the predetermined type of predicated vector load micro-operation to the processing circuitry.

3. The apparatus according to claim 1, in which the issue circuitry is configured to re-issue the predetermined type of predicated vector load micro-operation to the processing circuitry when the predicate operand is determined to meet the availability condition.

4. The apparatus according to claim 1, in which:
in response to determining that the predetermined condition is unsatisfied for the predetermined type of predicated vector load micro-operation, the memory access circuitry is configured to allow the complete vector load to proceed without being flushed even when the predicate operand when available indicates at least one inactive vector element.

5. The apparatus according to claim 1, in which the memory access circuitry is configured to determine that the predetermined condition is satisfied for the predetermined type of predicated vector load micro-operation when the memory access circuitry determines that performing the complete vector load in response to the predetermined type of predicated vector load micro-operation would cause at least one address-dependent memory-access-related side-effect.

6. The apparatus according to claim 5, in which when the predetermined type of predicated vector load micro-operation is processed when the predicate operand is already available, the memory access circuitry is configured to suppress the at least one address-dependent memory-access-related side-effect being caused by a load associated with an inactive vector element of the destination vector register indicated by the predicate operand.

7. The apparatus according to claim 1, in which the memory access circuitry is configured to determine that the predetermined condition is satisfied for the predetermined type of predicated vector load micro-operation when the memory access circuitry determines based on the load target address that, if the complete vector load was performed, the complete vector load would cause a fault.

8. The apparatus according to claim 1, in which the memory access circuitry is configured to determine that the predetermined condition is satisfied for the predetermined type of predicated vector load micro-operation, when the memory access circuitry determines based on the load target address that, if the complete vector load was performed, the complete vector load would cause an access to a device region of memory address space allocated for communication with a device other than a memory storage device.

9. The apparatus according to claim 1, in which the memory access circuitry is configured to determine that the predetermined condition is satisfied for the predetermined type of predicated vector load micro-operation, when the memory access circuitry determines based on the load target address that if the complete vector load was performed, the complete vector load would cause a memory access to an address defined as a watchpoint address for which a diagnostic operation is to be triggered when an access to the watchpoint address is requested.

10. The apparatus according to claim 1, in which:
when the predicated vector load micro-operation is a second type of predicated vector load micro-operation, the issue circuitry is configured to defer issuing of the second type of predicated vector load micro-operation to the processing circuitry until the predicate operand is determined to meet the availability condition.

11. The apparatus according to claim 1, in which:
in response to a predicated vector store micro-operation specifying a store target address, a source vector register for which data from active vector elements of the source vector register is to be stored to memory locations associated with addresses identified based on the store target address, and a store predicate operand indicative of whether each vector element of the source vector register is active or inactive:
the issue circuitry is configured to defer issuing the predicated vector store micro-operation to the processing circuitry until the store predicate operand is determined to meet the availability condition.

12. The apparatus according to claim 1, comprising instruction decoding circuitry to decode instructions to generate the micro-operations to be issued to the processing circuitry; in which:
in response to decoding a predicated-loop-body instruction, the instruction decoding circuitry is configured to generate a plurality of micro-operations for controlling the processing circuitry to perform an iteration of a predicated loop body comprising:
determining a variable number of bytes to be processed in the iteration:
performing a predicated vector load operation predicated based on the variable number of bytes;
performing at least one further predicated operation which is dependent on the predicated vector load operation and is predicated based on the variable number of bytes; and
updating, based on the variable number of bytes, a remaining bytes parameter indicative of a number of bytes remaining to be processed; and
in response to decoding the predicated-loop-body instruction, the instruction decoding circuitry is configured to generate the predetermined type of predicated vector load micro-operation for performing the predicated vector load operation of the predicated loop body.

13. The apparatus according to claim 12, in which the at least one further predicated operation is one of:
a predicated vector store operation; and
a predicated vector compare operation.

14. The apparatus according to claim 12, in which in response to the predicated-loop-body instruction, the instruction decoding circuitry is configured to generate at least one micro-operation to control the processing circuitry to determine the variable number of bytes based on alignment, with respect to an alignment boundary, of at least one of:
a load target address of the predicated vector load operation; and
where the at least one further predicated operation is a predicated vector store operation, a store target address of the predicated vector store operation.

15. The apparatus according to claim 12, in which in response to the predicated-loop-body instruction, the instruction decoding circuitry is configured to generate at least one micro-operation to control the processing circuitry to determine the variable number of bytes based on the remaining bytes parameter.

16. The apparatus according to claim 12, in which the iteration of the predicated loop body also comprises controlling whether a further iteration of the predicated loop body is to be performed based on whether a loop termination condition is satisfied by the remaining bytes parameter.

17. The apparatus according to claim 1, comprising instruction decoding circuitry to decode instructions to generate the micro-operations to be issued to the processing circuitry; in which:
the instruction decoding circuitry is configured to generate the predetermined type of predicated vector load micro-operation in response to an instruction for implementing a string.h C library function which acts on a string stored in memory.

18. The apparatus according to claim 1, comprising instruction decoding circuitry to decode instructions to generate the micro-operations to be issued to the processing circuitry; in which:
the instruction decoding circuitry is configured to generate the predetermined type of predicated vector load micro-operation in response to a memory copy instruction for copying data from a first memory region to a second memory region.

19. A method comprising:
controlling issuing of micro-operations, decoded from instructions, to processing circuitry, where the controlling of issuing is based on whether operands of the micro-operations meet an availability condition, and the processing circuitry comprises memory access circuitry to control issuing of memory access requests; and
in response to a predicated vector load micro-operation specifying a load target address, a destination vector register for which active vector elements of the destination vector register are to be loaded with data associated with addresses derived from the load target address, and a predicate operand indicative of whether each vector element of the destination vector register is active or inactive, when the predicated vector load micro-operation is a predetermined type of predicated vector load micro-operation:
issuing the predetermined type of predicated vector load micro-operation to the processing circuitry before the predicate operand is determined to meet the availability condition;
determining, based on the load target address, whether the predetermined type of predicated vector load micro-operation satisfies a predetermined condition; and
in response to determining that the predetermined condition is unsatisfied for the predetermined type of predicated vector load micro-operation, performing a complete vector load assuming all vector elements of the destination vector register are active vector elements, independent of whether the predicate operand when available identifies any inactive vector element of the destination vector register.

20. A non-transitory computer-readable medium to store computer-readable code for fabrication of an apparatus comprising:
processing circuitry to perform data processing in response to micro-operations decoded from instructions, the processing circuitry comprising memory access circuitry to control issuing of memory access requests; and
issue circuitry to control issuing of the micro-operations to the processing circuitry based on whether operands of the micro-operations meet an availability condition; in which:
in response to a predicated vector load micro-operation specifying a load target address, a destination vector register for which active vector elements of the destination vector register are to be loaded with data associated with addresses identified based on the load target address, and a predicate operand indicative of whether each vector element of the destination vector register is active or inactive:
when the predicated vector load micro-operation is a predetermined type of predicated vector load micro-operation, the issue circuitry is capable of issuing the predetermined type of predicated vector load micro-operation to the processing circuitry before the predicate operand is determined to meet the availability condition; and
when the predetermined type of predicated vector load micro-operation is issued to the processing circuitry before the predicate operand meets the availability condition, the memory access circuitry is configured to:
determine, based on the load target address, whether the predetermined type of predicated vector load micro-operation satisfies a predetermined condition; and
in response to determining that the predetermined condition is unsatisfied for the predetermined type of predicated vector load micro-operation, perform a complete vector load assuming all vector elements of the destination vector register are active vector elements, independent of whether the predicate operand when available identifies any inactive vector element of the destination vector register.

* * * * *